US012794878B2

(12) United States Patent
Babichev et al.

(10) Patent No.: US 12,794,878 B2
(45) Date of Patent: Nov. 10, 2026

(54) METHODS, SERVERS AND SYSTEMS FOR TRIGGERING A REMEDIAL ACTION TO A POTENTIAL THREAT TO A COMPUTER NETWORK

(71) Applicant: Y.E. Hub Armenia LLC, Yerevan (AM)

(72) Inventors: Andrei Babichev, Korolyov (RU); Vladimir Smolev, Moscow (RU); Sergei Statev, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 49 days.

(21) Appl. No.: 19/072,042

(22) Filed: Mar. 6, 2025

(65) Prior Publication Data

US 2025/0310319 A1 Oct. 2, 2025

(30) Foreign Application Priority Data

Mar. 26, 2024 (RU) ........................... RU2024107906

(51) Int. Cl.
*H04L 9/40* (2022.01)

(52) U.S. Cl.
CPC ........ *H04L 63/083* (2013.01); *H04L 63/1416* (2013.01)

(58) Field of Classification Search
CPC .......................... H04L 63/083; H04L 63/1416
See application file for complete search history.

(56) References Cited

U.S. PATENT DOCUMENTS

| | | | | |
|---|---|---|---|---|
| 8,201,257 | B1 | 6/2012 | Andres et al. | |
| 11,818,219 | B2 * | 11/2023 | Sheshadri | H04L 63/168 |

(Continued)

FOREIGN PATENT DOCUMENTS

| | | | |
|---|---|---|---|
| CN | 113886821 | A | 1/2022 |
| CN | 114915496 | A | 8/2022 |

(Continued)

OTHER PUBLICATIONS

Corizzo et al., "Feature extraction based on word embedding models for intrusion detection in network traffic", Published online on Dec. 28, 2020, Journal of Surveillance, Security and Safety, DOI: 10.20517/jsss.2020.15.

(Continued)

*Primary Examiner* — Stephen T Gundry
(74) *Attorney, Agent, or Firm* — BCF LLP

(57) ABSTRACT

Methods, servers, and systems for triggering a remedial action for a computer network are disclosed. The method includes, during a first user session: acquiring a textual string representing a command; generating a set of vectors using the textual string, generating a session vector using the set of vectors and indicative of text-based command patterns of the first user. The method includes, during a current user session: acquiring a current textual string representing a current command, generating a set of current vectors using the current textual string, generating a current session vector using the set of current vectors and indicative of text-based command patterns of a current user, generating a comparison value between the session vector and the current session vector indicative of similarity between the text-based command patterns of the first user and the current user, and triggering the remedial action using the comparison value.

20 Claims, 6 Drawing Sheets

(56) References Cited

U.S. PATENT DOCUMENTS

| | | | | |
|---|---|---|---|---|
| 12,626,012 | B2 * | 5/2026 | Van Antwerp | G06F 21/316 |
| 12,627,687 | B1 * | 5/2026 | Adamson | G06F 9/5072 |
| 12,652,302 | B1 * | 6/2026 | Parikh | H04L 63/1425 |
| 2011/0023115 | A1 | 1/2011 | Wright | |
| 2016/0330219 | A1 | 11/2016 | Hasan | |
| 2020/0220892 | A1 | 7/2020 | Gibson | |
| 2020/0314117 | A1 * | 10/2020 | Nguyen | H04W 12/12 |
| 2020/0327225 | A1 * | 10/2020 | Nguyen | G06N 3/08 |
| 2022/0035692 | A1 | 2/2022 | Wang et al. | |
| 2023/0062052 | A1 * | 3/2023 | Sheshadri | H04L 63/0272 |
| 2023/0239315 | A1 | 7/2023 | Lesperance et al. | |
| 2024/0412720 | A1 * | 12/2024 | Vasylyev | G06F 16/90332 |
| 2025/0077487 | A1 * | 3/2025 | Groenewegen | G06F 16/215 |
| 2026/0093824 | A1 * | 4/2026 | Endler | G06F 16/9538 |
| 2026/0106848 | A1 * | 4/2026 | Moon | H04L 51/02 |

FOREIGN PATENT DOCUMENTS

| | | | |
|---|---|---|---|
| GB | 2581011 | A | 8/2020 |
| RU | 2802539 | C1 | 8/2023 |
| WO | 2022156986 | A1 | 7/2022 |

OTHER PUBLICATIONS

Czangyeob et al., "Intrusion Detection Based on Sequential Information Preserving Log Embedding Methods and Anomaly Detection Algorithms", Published on Apr. 8, 2021, IEEE Access, Digital Object Identifier 10.1109/ACCESS.2021.3071763.

Russian Search Report dated Aug. 12, 2025 issued in respect of the counterpart Russian Patent Application No. RU 2024107906.

* cited by examiner

METHODS, SERVERS AND SYSTEMS FOR TRIGGERING A REMEDIAL ACTION TO A POTENTIAL THREAT TO A COMPUTER NETWORK

CROSS-REFERENCE

The present application claims priority to Russian Patent Application No. 2024107906, entitled “Methods, Servers and Systems for Triggering a Remedial Action to a Potential Threat to a Computer Network”, filed Mar. 26, 2024, the entirety of which is incorporated herein by reference.

FIELD

The present technology is generally related to computer network security, and more specifically, to methods servers and systems for triggering a remedial action to a potential threat to a computer network.

BACKGROUND

Conventional computer network security systems can also execute authentication and access control mechanisms for reducing the risk of potential threats to the computer network. However, credentials can be compromised, and therefore may be used by malicious users for accessing data on a computer network.

User activity monitoring (UAM) can be used as part of cybersecurity strategies aimed at safeguarding computer networks. UAM involves tracking and recording user behaviors within a system or network, such as login/logout events, file access, and application usage, for example. These methods provide organizations with insights into user activities, allowing for the early identification of potential security threats.

WO 2022/156986 discloses a method of identifying anomalous behavior of a computer system in a set of intercommunicating computer systems. The method comprises monitoring communication between computer systems in the set to generate, a first and a second vector representation of each of the computer systems. However, the method includes identifying computer system behavior as opposed to user-related behavior.

SUMMARY

Developers have devised methods and devices for overcoming at least some drawbacks present in prior art solutions.

In a broad aspect of the present technology, there is provided a security system configured to monitor user activity on a computer network and detect potential user-related threats to the computer network and/or data available thereon.

It is contemplated that the security system may be configured to execute a combination of machine learning algorithms, statistical analysis, and/or heuristic methods to extract text-based command patterns of users have necessary credentials or that are otherwise allowed to access the computer network. Developers have realized that information indicative of text-based command patterns, such as input commands from programmers in natural language and/or programming language, may be used for generating, in a sense, “signatures” for respective users.

The security system may monitor text-based command patterns of users across one or more user sessions with the computer network, and trigger remedial actions when a current text-based command pattern for a given user diverges from the normal text-based command pattern for that given user. Developers of the present technology have realized that, as opposed to some conventional techniques where event-based pattern tracking can be used for identifying potential threats, execution of text-based command pattern tracking may be advantageous due to more accurate and distinguishable user-specific signatures.

Developers of the present technology have realized that programmers typically exhibit distinct and personalized textual patterns when writing code and/or communicating with data storages, servers, and the like. As a result, text-based command pattern tracking may allow the security system to better distinguish between different users submitting text-based commands over the computer network.

In some embodiments of the present technology, there are provided methods and servers for recognizing text-based input patterns of users within a computer network, such as local area computer networks (LANs), and wide-area computer networks (WANs), for example.

It is contemplated that a user input may take the form of a textual string submitted by the user in a natural language and/or in one or more programming languages. The user input may be representative of a command to be executed on a database of the computer network. In some embodiments, the computer system may be configured to extract text-based command patterns for specific users based on such user inputs and determine whether a current user is actually the authorized user or a malicious user, despite using credentials of the authorized user for connecting to the computer network.

Developers of the present technology have realized that such a security system may be useful in cases where the user device and/or credentials of the given user have been compromised and are fraudulently used for connecting to the computer network.

In a first broad aspect of the present technology, there is provided a method of triggering a remedial action to a potential threat to a computer network. The computer network comprises a security server and a database. The computer network is communicatively couplable with a user device. The method is executable by the security server and comprises: during a first user session: acquiring a textual string representing a command to be executed on the database, the textual string being associated with first credentials of a first user; generating a set of vectors based on the textual string, the set of vectors having different sizes, the generating including: generating a first vector indicative of a command type of the command; generating a second vector indicative of a command name of the command; and generating a third vector indicative of a command body of the command; combining the set of vectors to generate a command vector which is indicative of text-based command patterns of the first user; storing the command vector in association with the first credentials. Further, during a current user session, the method comprises: acquiring a current textual string representing a current command to be executed on the database, the current textual string being associated with the first credentials; generating a set of current vectors based on the current textual string, the set of current vectors having different sizes, the generating including: generating a first current vector indicative of the command type of the current command; generating a second current vector indicative of the command name of the current command; and generating a third current vector indicative of the command body of the current textual string;

combining the set of current vectors to generate a current command vector, which is indicative of text-based command patterns of a current user; accessing the command vector associated with the first credentials of the first user; generating a comparison value between the command vector and the current command vector, the comparison value being indicative of similarity between the text-based command patterns of the first user and the text-based command patterns of the current user; triggering the remedial action using the comparison value.

In some embodiments of the method, the method further comprises: prior to the first user session: acquiring credential data representative of the credentials of the first user; authenticating the first user using the credential data; and triggering the first user session.

In some embodiments of the method, the method further comprises: prior to the current user session: acquiring current credential data representative of the credentials of the first user; authenticating the current user as the first user using the current credential data; and triggering the current user session; and wherein the triggering the remedial action includes triggering the remedial action despite the current user being authenticated as the first user based on the current credential data.

In some embodiments of the method, the remedial action is at least one of: prohibiting execution of the current command on the database; interrupting the current user session; decoupling the other user device from the computer network; and suspending credentials of the first user.

In some embodiments of the method, the method further comprises: in response to the comparison value being above a pre-determined threshold, triggering execution of the current command on the database.

In some embodiments of the method, the triggering the remedial action comprises: triggering the remedial action in response to the comparison value being below a pre-determined threshold.

In some embodiments of the method, the first vector has a first size, the second vector having a second size, the third vector having a third size, the third size being larger than the first size and the second size.

In some embodiments of the method, the generating the third vector includes generating a reduced textual string by filtering out pre-determined textual characters from the textual string.

In some embodiments of the method, the combining the set of vectors to generate the command vector comprises concatenating the first, second, and third vectors.

In some embodiments of the method, the generating the comparison value comprises determining a cosine similarity value between the command and current command vectors.

In some embodiments of the method, the method further comprises: accessing a plurality of command vectors including the command vector, each command vector of the plurality of command vectors having been generated based on a respective command executed by the first user prior to the current session; generating respective pairwise comparison values between the current command vector and each one of the plurality of command vectors; determining a combined value of the respective pairwise comparison values; and wherein the triggering the remedial action comprises triggering the remedial action using the combined value of the respective pairwise comparison values.

In some embodiments of the method, prior to the determining the combined value, the method further comprises selecting top-N respective pairwise comparison values; and wherein the determining the combined value comprises determining a combined value of the top-N respective pairwise comparison values.

In some embodiments of the method, the determining the combined value comprises determining one of an average value and a median value of the respective pairwise comparison values.

In some embodiments of the method, prior to the generating the comparison value, the method further comprises: during the first user session: acquiring other textual string, from the user device, representing an other command to be executed on the database, the other textual string being associated with the first credentials; generating a set of other vectors based on the other textual string, the set of other vectors having different sizes, the generating including: generating a first other vector indicative of a command type of the other command; generating a second other vector indicative of the command name the other command; and generating a third other vector indicative of the command body of the other textual string; and wherein the generating the command vector includes generating a session vector by applying a machine-learning model to the set of vectors and the set of other vectors; and wherein during the current user session, the method further comprises: generating a current session vector by applying the machine-learning model to the set of current vectors; and wherein the generating the comparison values comprises generating the comparison value between the current session vector and the session vector.

In some embodiments of the method, the command body of the command comprises a set of respective instructions to be executed on the database.

In some embodiments of the method, prior to the generating the third vector, the method further comprising normalizing the set of instructions of the command body.

In some embodiments of the method, the textual string and the current textual string are both received from the user device or received from different user devices.

Further, in a second broad aspect of the present technology, there is provided a server for triggering a remedial action to a potential threat to a computer network. The computer network comprising the server and a database. The computer network is communicatively couplable with a user device. The server is configured to: during a first user session: acquire a textual string representing a command to be executed on the database, the textual string being associated with first credentials of a first user; generate a set of vectors based on the textual string, the set of vectors having different sizes, by: generating a first vector indicative of a command type of the command; generating a second vector indicative of a command name of the command; and generating a third vector indicative of a command body of the command; combine the set of vectors to generate a command vector which is indicative of text-based command patterns of the first user; store the command vector in association with the first credentials. Further, during a current user session, the server is configured to: acquire a current textual string representing a current command to be executed on the database, the current textual string being associated with the first credentials; generate a set of current vectors based on the current textual string, the set of current vectors having different sizes, by: generating a first current vector indicative of the command type of the current command; generating a second current vector indicative of the command name of the current command; and generating a third current vector indicative of the command body of the current textual string; combine the set of current vectors to generate a current command vector, which is indicative of text-based command patterns of a current user; access the command vector associated with the first credentials of the first user; generate a comparison value between the command vector and the current command vector, the comparison value being indicative of similarity between the text-based command patterns of the first user and the text-based command patterns of the current user; trigger the remedial action using the comparison value.

In some embodiments of the server, the server is further configured to: prior to the first user session: acquire credential data representative of the credentials of the first user; authenticate the first user using the credential data; and trigger the first user session.

In some embodiments of the method, the server is further configured to: prior to the current user session: acquire current credential data representative of the credentials of the first user; authenticate the current user as the first user using the current credential data; and trigger the current user session; and wherein to trigger the remedial action includes the server configured to trigger the remedial action despite the current user being authenticated as the first user based on the current credential data.

In a third broad aspect of the present technology, there is provided a method of triggering a remedial action to a potential threat to a computer network. The computer network comprises a security server and a database. The computer network is communicatively couplable with a user device. The method executable by the security server and comprises during a first user session: acquiring a textual string representing a command to be executed on the database, the textual string being associated with first credentials of a first user; generating a set of vectors based on the textual string, the set of vectors having different sizes, the generating including: generating a first vector indicative of a command type of the command; generating a second vector indicative of a database address of the command; and generating a third vector indicative of a filtered representation of the textual string. The method comprises during a first user session, generating, using a machine learning model, a session vector for the first user session using the set of vectors, the session vector being indicative of text-based command patterns of the first user. The method comprises during a first user session, storing the session vector in association with the first credentials. The method comprises, during a current user session, acquiring a current textual string representing a current command to be executed on the database, the current textual string being associated with the first credentials. The method comprises, during a current user session, generating a set of current vectors based on the current textual string, the set of current vectors having different sizes, the generating includes generating a first current vector indicative of a command type of the current command; generating a second current vector indicative of a database address of the current command; and generating a third current vector indicative of a filtered representation of the current textual string. The method comprises, during a current user session, generating, using the machine learning model, a current session vector for the current user session using the set of current vectors, the current session vector being indicative of text-based command patterns of a current user. The method comprises, during a current user session, accessing the session vector associated with the first credentials of the first user. The method comprises, during a current user session, generating a comparison value between the session vector and the current session vector. The comparison value is indicative of similarity between the text-based command patterns of the first user and the text-based command patterns of the current user. The method comprises, during a current user session, triggering the remedial action using the comparison value.

In some embodiments of the method, the method further comprises, prior to the first user session: acquiring credential data representative of the credentials of the first user, authenticating the first user using the credential data, and triggering the first user session.

In some embodiments of the method, the method further comprises, prior to the current user session: acquiring current credential data representative of the credentials of the first user, authenticating the current user as the first user using the current credential data, and triggering the current user session; and wherein the triggering the remedial action includes triggering the remedial action despite the current user being authenticated as the first user based on the current credential data.

In some embodiments of the method, the remedial action is at least one of: prohibiting execution of the current command on the database, interrupting the current user session, decoupling the other user device from the computer network. and suspending credentials of the first user.

In some embodiments of the method, the method further comprises in response to the comparison value being above a pre-determined threshold, triggering execution of the current command on the database.

In some embodiments of the method, the triggering the remedial action comprises triggering the remedial action in response to the comparison value being below a pre-determined threshold.

In some embodiments of the method, the first vector has a first size, the second vector having a second size, the third vector having a third size, the third size being larger than the first size and the second size.

In some embodiments of the method, the generating the third vector includes generating a reduced textual string by filtering out pre-determined textual characters from the textual string.

In some embodiments of the method, the method further comprises during the first user session: acquiring other textual string, from the user device, representing an other command to be executed on the database, the other textual string being associated with the first credentials; generating a set of other vectors based on the other textual string, the set of other vectors having different sizes, the generating including: generating a first other vector indicative of a command type of the other command; generating a second other vector indicative of a database address of the other command; and generating a third other vector indicative of a filtered representation of the other textual string. The generating the session vector includes generating the session vector further using the set of other vectors.

In some embodiments of the method, the textual string and the current textual string are both received from the user device or received from different user devices.

In a fourth broad aspect of the present technology, there is provided a server for triggering a remedial action to a potential threat to a computer network. The computer network comprises the server and a database. The computer network us communicatively couplable with a user device. The server is configured to during a first user session, acquire a textual string representing a command to be executed on the database, the textual string being associated with first credentials of a first user. The server is configured to during a first user session generate a set of vectors based on the textual string, the set of vectors having different sizes, to generate including the server being configured to, generate a first vector indicative of a command type of the command, generate a second vector indicative of a database address of the command, and generate a third vector indicative of a filtered representation of the textual string. The server is configured to during a first user session generate, using a machine learning model, a session vector for the first user session using the set of vectors, the session vector being indicative of text-based command patterns of the first user. The server is configured to during a first user session store the session vector in association with the first credentials. The server is configured to during a current user session, acquire a current textual string representing a current command to be executed on the database, the current textual string being associated with the first credentials. The server is configured to during a current user session, generate a set of current vectors based on the current textual string, the set of current vectors having different sizes, to generate including the server being configured to: generate a first current vector indicative of a command type of the current command generate a second current vector indicative of a database address of the current command; and generate a third current vector indicative of a filtered representation of the current textual string. The server is configured to during a current user session, generate, using the machine learning model, a current session vector for the current user session using the set of current vectors, the current session vector being indicative of text-based command patterns of a current user. The server is configured to during a current user session, access the session vector associated with the first credentials of the first user. The server is configured to during a current user session, generate a comparison value between the session vector and the current session vector. The server is configured to during a current user session, the comparison value being indicative of similarity between the text-based command patterns of the first user and the text-based command patterns of the current user. The server is configured to during a current user session, triggering the remedial action using the comparison value.

In some embodiments of the server, the server is further configured to, prior to the first user session: acquire credential data representative of the credentials of the first user; authenticate the first user using the credential data; and trigger the first user session.

In some embodiments of the server, the server is further configured to, prior to the current user session: acquire current credential data representative of the credentials of the first user; authenticate the current user as the first user using the current credential data; and trigger the current user session. Triggering the remedial action includes triggering the remedial action despite the current user being authenticated as the first user based on the current credential data.

In some embodiments of the server, the remedial action is at least one of: prohibiting execution of the current command on the database, interrupting the current user session, decoupling the other user device from the computer network, and suspending credentials of the first user.

In some embodiments of the server, the server is further configured to in response to the comparison value being above a pre-determined threshold, trigger execution of the current command on the database.

In some embodiments of the server, to trigger the remedial action comprises the server configured to trigger the remedial action in response to the comparison value being below a pre-determined threshold.

In some embodiments of the server, the first vector has a first size, the second vector having a second size, the third vector having a third size, the third size being larger than the first size and the second size.

In some embodiments of the server, to generate the third vector includes the server being configured to generate a reduced textual string by filtering out pre-determined textual characters from the textual string.

In some embodiments of the server, the server is further configured to during the first user session: acquire other textual string, from the user device, representing an other command to be executed on the database, the other textual string being associated with the first credentials; generate a set of other vectors based on the other textual string, the set of other vectors having different sizes, to generate including the server being configured to: generate a first other vector indicative of a command type of the other command; generate a second other vector indicative of a database address of the other command; and generate a third other vector indicative of a filtered representation of the other textual string. To generate the session vector includes the server being configured to generate the session vector further using the set of other vectors.

In some embodiments of the server, the textual string and the current textual string are both received from the user device or received from different user devices.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
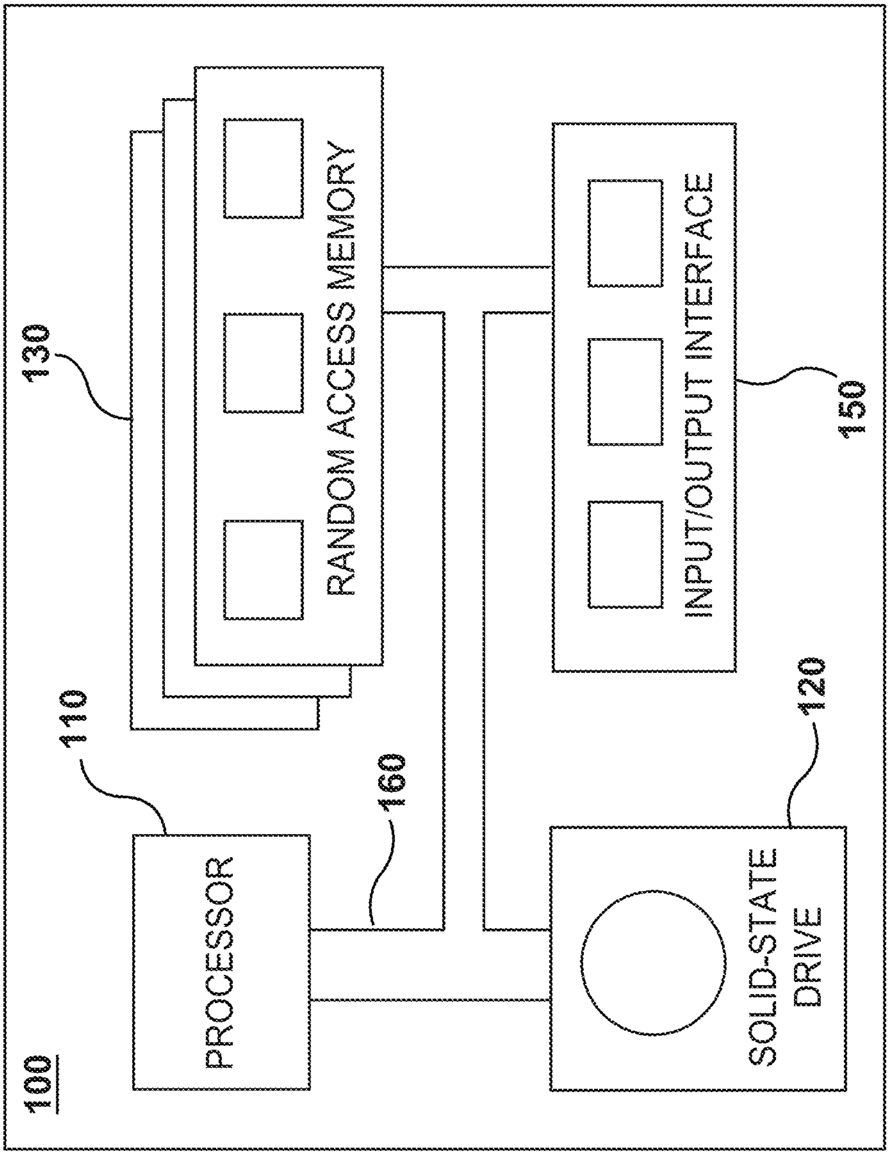
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (Saas). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Computer Network

Figure 2:
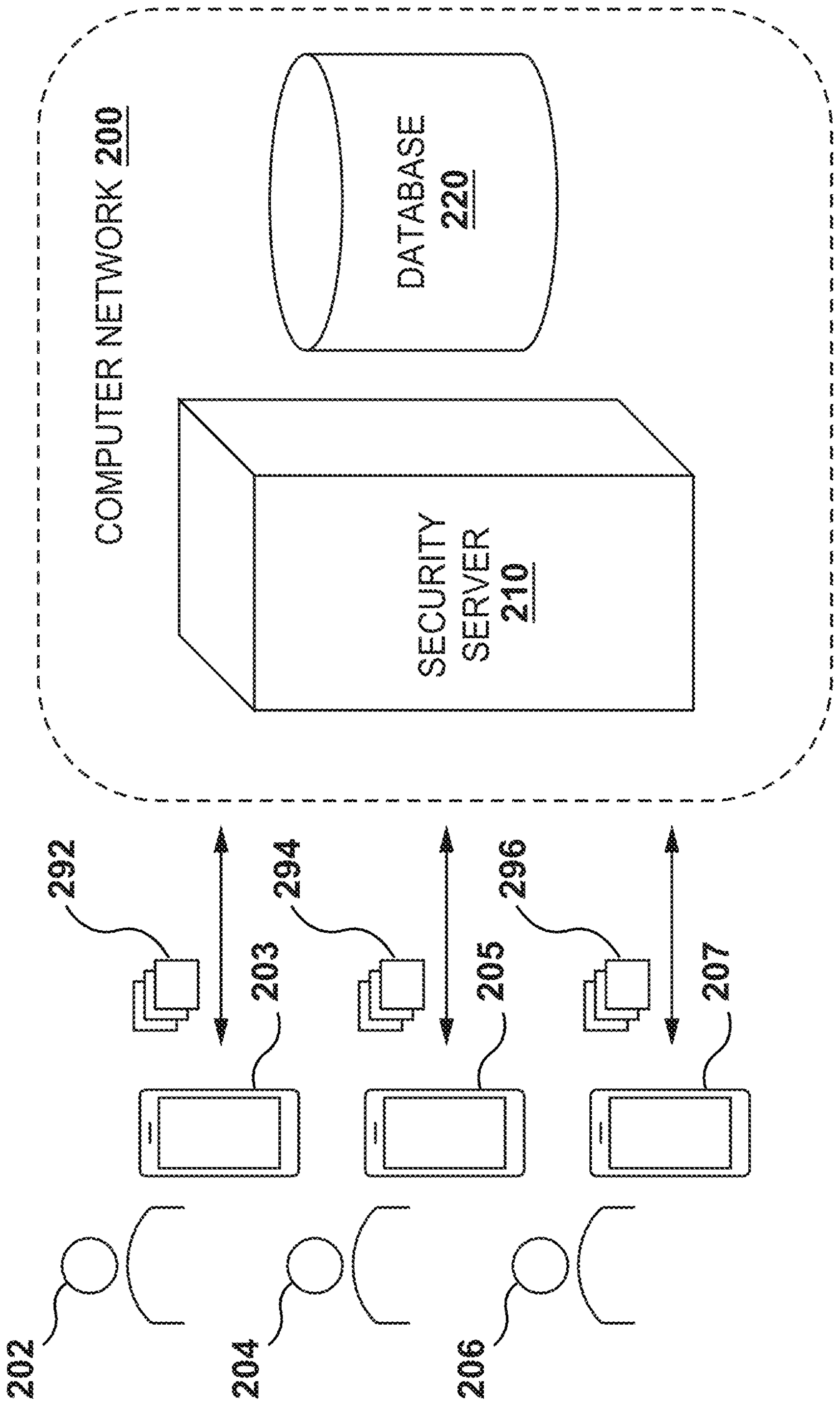
FIG. 2 illustrates an example of a computer network as contemplated in at least some non-limiting embodiments of the present technology.

With reference to FIG. 2, there is depicted a computer network 200 as contemplated in at least some embodiments of the present technology. One or more user devices, such as user devices 203, 205, and 207 are communicatively couplable with the computer network 200. The user devices 203, 205, and 207 are associated with users 202, 204, and 206, respectively. A given one amongst the user devices 203, 305, and 207 may be implemented similarly to how the computer device 100 of FIG. 1 is implemented, without departing from the scope of the present technology.

In some embodiments, a given user of a given user device may need to submit, via the given user device interface his/her previously assigned user credentials for authentication purposes. As it will become apparent from the description herein further below, these credentials may be used for providing access to the computer network 200 and/or one or more components thereof.

Broadly speaking, the computer network 200 is an interconnection of multiple computing devices, such as computers, servers, routers, switches, and/or other networked equipment, configured to communicate with one another. A computer network infrastructure may be organized through a set of protocols, standards, and physical and/or wireless mediums that enable the transmission of data. In the non-limiting example of FIG. 2, the computer network 200 comprises inter alia a security server 210 and a database 220. The security server 210 may be implemented similarly to how the computer device 100 of FIG. 1 is implemented, without departing from the scope of the present technology. The database 220 may be implemented on the computer device 100 of FIG. 1, without departing from the scope of the present technology.

The computer network 200 may include nodes, which are individual devices connected to the network, such as computers, servers (e.g., the security server 210), printers, and other end-user devices (e.g., the user devices 203, 205, and 207), for example. The computer network 200 may include links representing communication pathways between nodes. In some implementations, these can be physical cables (wired connections) and/or wireless connections, such as Wi-Fi connections, for example. The computer network 200 may include network devices used to manage and facilitate the flow of data within the network 200. For example, touters, switches, and hubs are non-exhaustive examples of network devices that can be used in the computer network 200 for directing and/or controlling data traffic. The computer network 200 may be orchestrated via network protocols representing a set of rules and conventions that govern communication between the interconnected devices. For example, a Transmission Control Protocol/Internet Protocol (TCP/IP) can be used for data transmission over the internet. Devices on the computer network 200 are assigned unique addresses to enable identification and routing. IP addresses are commonly used in Internet Protocol-based networks.

In some embodiments, the computer network 200 may be a local area network (LAN) within a single building. In other embodiments, the computer network 200 may be a wide area networks (WAN) connecting geographically dispersed locations, without departing from the scope of the present technology. The design and implementation of the computer network 200 may depend on inter alia the specific requirements of the organization or application, considering factors such as data volume, security needs, and performance expectations.

The computer network 200 may be configured to execute one or more algorithms for mitigating threats to the computer network 200. For example, the security server 210 may be configured to execute a variety of algorithms to secure data and prevent unauthorized access to the computer network 200. As it will become apparent from the description herein further below, the security server 210 may implement one or more authentication mechanisms, access control mechanisms, and anomaly detection mechanisms for preventing threats to the computer network 200.

Broadly, the security server 210 may employ one or more authentication mechanisms for verifying user identity for selective access to sensitive information on the computer network 200. For example, username and password combinations are often used as part of user credentials. In another example, multifactor authentication (MFA) may be used by requiring multiple identification forms, such as passwords, security tokens, biometric data, and the like.

Broadly, the security server 210 may employ one or more access control mechanisms for minimizing the risk of unauthorized access to sensitive data. For example, Access Control Lists (ACLs) may be used to specify permissions for users or processes regarding files, directories, or network resources. Encryption algorithms may also be used by the security server 210 to transform data into an encrypted format, in which the data can be transmitted over the computer network 200.

As it will become apparent from the description herein further below, the security server 210 may execute one or more algorithms for determining whether a current user providing a current command over the computer network 200 is an authorized user or a malicious user, even if valid credentials have been used for accessing data over the computer network 200. For example, the security server 210 may be configured to analyze user input commands, provided in a form of one or more textual strings, for accessing data stored in the database 220.

User Session

Figure 3:
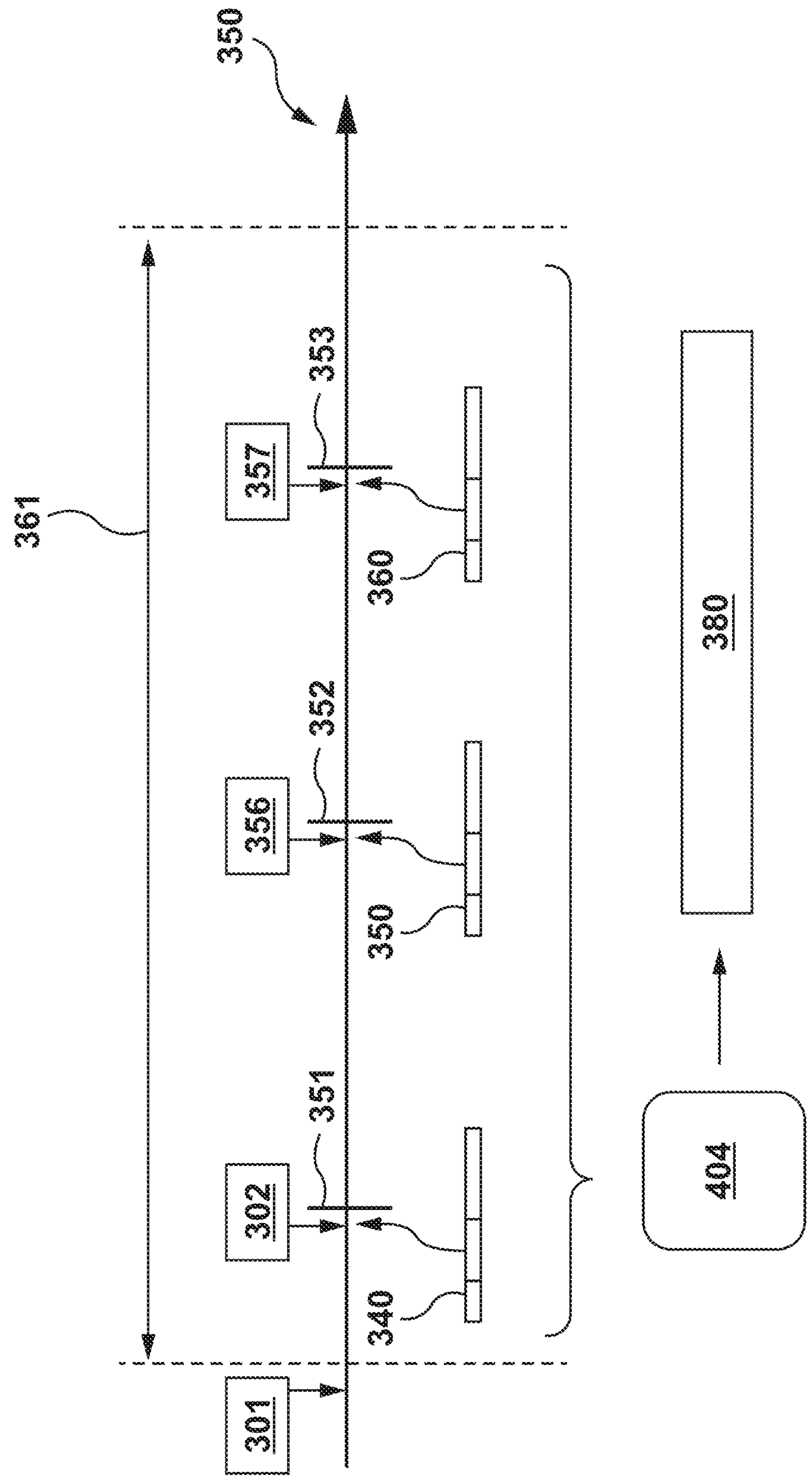
FIG. 3 is a schematic representation of a first user session on the computer network as contemplated in at least some non-limiting embodiments of the present technology.

With reference to FIG. 3, there is depicted a timeline 350 with a first user session 361 on the computer network 200 of FIG. 2. At a given moment in time, credential data 301 representative of the first user 202 may be acquired by the security server 210 from the user device 203. In this example, the security server 210 may use user credentials from the credential data 301 for authenticating the first user 202. In some embodiments, a given user session may begin following credential validation performed by the security server 210.

It is contemplated that the security server 210 may be configured to acquire textual strings 302, 356, and 357 representative of three inputted commands by the user 202 during the first user session 361.

The security server 210 may receive the textual character string 302 at a first moment in time 351, the textual string 356 at a second moment in time 352, and the textual string 357 at a third moment in time 353. It is contemplated that the security server 210 may be configured to monitor textual data provided by users during respective user sessions, generate a plurality of vectors based on the monitored textual data, and store the generated vectors in a storage. For example, the security server 210 may be configured to generate a first set of vectors 340 at the first moment in time based on the textual character string 302, a second set of vectors 350 at the second moment in time 352 based on the textual string 356, and a third set of vectors 360 at the third moment in time 353 based on the textual string 357. How the security server 210 is configured to generating any of the first set of vectors, the second set of vectors 250, and the third set of vectors will be described in greater details herein further below with reference to FIG. 4.

It is contemplated that the security server 210 may be configured to determine one or more sets of vectors during the first user session 361 and employ a machine learning algorithm (MLA) 404 to generate a session vector 380. It can be said that the session vector 380 is a user-specific and session-specific vector. The session vector 380 is indicative of a text-based command pattern of a specific user in a specific session.

In this example, the security server 210 may generate the session vector 380 for the user 202 and the first user session 361 based on the first set of vectors 340, the second set of vectors 350, and the third set of vectors 360. However, it is contemplated that only one set of vectors amongst the first set of vectors 340, the second set of vectors 350, and the third set of vectors 360 may be inputted into the MLA 404 in order to generate the session vector 380.

In some embodiments, the security server 210 may input the first set of vectors 340, the second set of vectors 350, and the third set of vectors 360 into the MLA 404, which in response may output the session vector 380. In other embodiments, the security server 210 may input the first set of vectors 340 into the MLA 404 configured to output in response a first command vector, input the second set of vectors 350 into the MLA 404 configured to output in response a second command vector, input the third set of vectors 360 into the MLA 404 configured to output in response a third command vector, and generate the session vector 380 as an average of the third command vector, the second command vector, and the third command vector.

Session Vector

Figure 4:
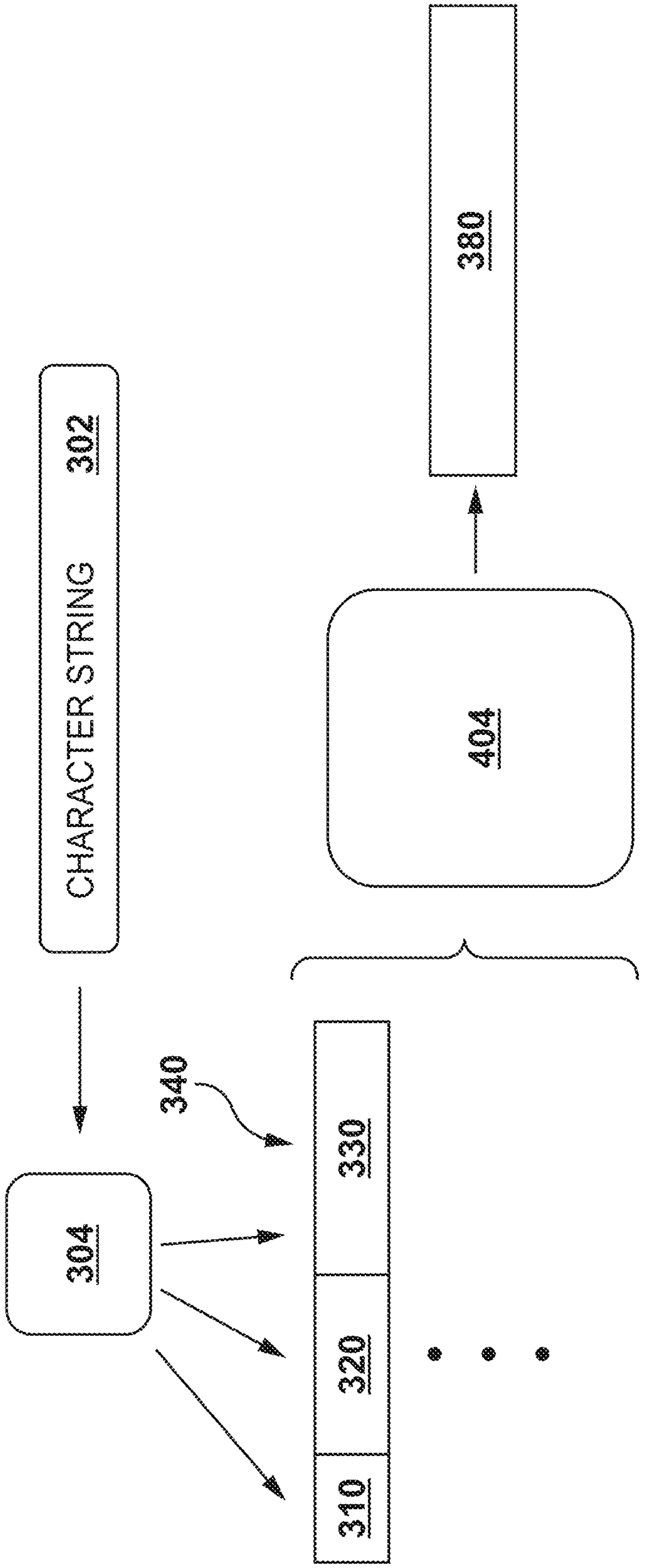
FIG. 4 is a schematic representation of a machine learning algorithm generating a session vector for the first user session of FIG. 3, as contemplated in at least some non-limiting embodiments of the present technology.

With reference to FIG. 4, there is depicted a processing pipeline of the textual character string 302 by the security server 210. For example, the textual character string 302 may be "[timestamp] 09:14:26, [command and parameters] ping "1111"-IP 127.0.0.1.". In another example, the textual character string 302 may be "[timestamp] 09:16:26, [command and parameters] for int xxx write yyy at C://main/zzz". In a further example, the textual character string 302 may be "[timestamp] 09:22:00, [command and parameters] def who (*args, zzz): sss".

Once the textual character string 302 is acquired by the security server 210, the security server 210 is configured to generate the first set of vectors 340 based on the textual character string 302, including a first vector 310, a second vector 320, and a third vector 330. All three vectors 310, 320, and 330 may be generated by the security server 210 based on a same character string provided to the security server 210. To that end, the security server 210 may employ one or more processing procedures of the textual character string 302.

The security server 210 may generate the first vector 310 indicative of a command type indicated in the textual character string 302. For example, the first vector 310 may be indicative of whether the user-command is a "writing" command type, "reading" command type, "access-request" command, "ping" command and the like. In other examples, the first vector 310 may be indicative of whether the user-command is at least one of a write command type, a read command, a system info command type, a network command type, a text manipulation command type, a crypto command type, a process command type, an archives command type, a user management command type, a packages command type, and others. According to certain non-limiting embodiments of the present technology, the security server 210 could be configured to determine a respective command type for each user-command from a pre-determined list of commands that have been pre-classified into respective command types. In some non-limiting embodiments of the present technology, each command in the pre-determined list of commands can also be assigned with an indicator of a respective user. This indicator can be assigned to a given user, such as the user 202, based, for example, on how frequently the user 202 submits the respective command.

According to some non-limiting embodiments of the present technology, the security server 210 can be configured to generate the second vector 320 indicative of a command name of the user-command. In other words, in these embodiments, the second vector can be indicative of a character string representative of the command name, such as "write" "read" "print" and the like.

The security server 210 may generate the third vector 330 indicative of a body of the user-command identified in the textual character string 302. For example, in some non-limiting embodiments of the present technology, the third vector 330 can be indicative of command instructions such as a database address, for example, included in the textual character string 302. In this example, the third vector 330 may be indicative of that the textual character string 302 is a "reading" command on data at the following database address "C://main/folder_1/al". In another example, the textual character string 302 can include an address reading "echo 123>/home/folder/path; Is –a" and the security server 210 may generate the third vector 330 being "echo". In a further example, the textual character string 302 without an address may be "uname–p" and the security server 210 may generate the second vector 320 being "uname."

In other non-limiting embodiments of the present technology, the third vector 330 can further be representative of an argument of the user-command representative of instructions to be executed on the database 220 via the user-command. More specifically, if the textual character string 302 reads: "[timestamp] 09:16:26, [command and parameters] for int xxx write yyy at C://main/zzz", the third vector 330 can be indicative of an argument of the command "write," that is, "yyy" and the specified database address in the textual character string 302, that is, "C://main/zzz". In yet other non-limiting embodiments of the present technology, the third vector can include the command name and the command body of the user-command, and, continuing with the above example, may thus have a following look: "write yyy at C://main/zzz."

In some non-limiting embodiments of the present technology, for generating the third vector 330, the security server 210 can be configured to normalize the command body of the user-command by filtering out therefrom certain characters of the textual character string 302 that are non-indicative of the user-command and its argument. For example, the third vector 330 may be indicative of all textual information encompassed within the command body in the textual character string 302 without at least one of syntaxial information, flag information, punctuations symbols, and the like. It is contemplated that a reduced/filtered textual string may be generated based on the textual character string 302 and a given filtering algorithm configured to filter our pre-determined characters from the textual character string 302.

In an other example, the textual character string 302 may be "echo 123>/home/folder/path; Is –a" and the security server 210 may generate the third vector 330 being "echo 123>/home/folder/path Is". In a further example, the textual character string 302 may be "Is—color auto/var/tmp" and the security server 210 may generate the third vector 330 being "Is/var/tmp".

According to certain non-limiting embodiments of the present technology, to generate the first, second, and third vectors 310, 320, and 330, the security server 210 could be configured to execute an extraction module 304 configured to analyze the textual character string 302. According to certain non-limiting embodiments of the present technology, the extraction module 304 can include: (1) a classifier for generating the first vector 310; and (2) a string parser configured to generate the second and third vectors 320, 330.

It should be noted that the first vector 310, and the second vector 320, and the third vector 330 are of different size due to different amount of data represented by the respective ones of the first vector 310, the second vector 320, the third vector 330. In this example, the first vector 310 is the shortest vector amongst the three vectors 310, 320, and 330, while the third vector 330 is a longest vector amongst the three vectors 310, 320, and 330.

In at least one example, based on the textual character string 302 being "[timestamp] 09:16:26, [command and parameters] for int xxx; write yyy [C://main . . . ]", the security server 210 may be configured to generate:

- the first vector 310 representing the command type "writing" data;
- the second vector 320 representing the command name including a character string reading "write;" network addressing "C://main . . . " for the command "writing" data; and
- the third vector 330 representing command body of the write command including at least one of an argument of the command and a specified address, that is, "yyy [C://main . . . ]", or in a normalized form "yyy C main".

As mentioned above, the security server 210 may be configured to employ the MLA 404 and at least the first set of vectors 340 for generating a given session vector 380.

In one embodiment, the MLA 404 may be a "doc2vec" model applied to at least the first set of vectors 340. The MLA 404 may be implemented in a similar manner to a model described in an article entitled "Distributed Representations of Sentences and Documents", authored by Quoc Le an Tomas Mikolov, and published on 22 May 2014, the contents of which is incorporated herein by reference in its entirety.

In one implementation, the doc2vec model 404 may process vectors with sizes varying from 1×100 to 1×500 with steps of 100, with a window size of one of 1, 5, 10, and 25, wherein the window parameter is indicative a maximum distance between a current and a predicted word within a sentence. In one implementation, the doc2vec model 404 may be trained using a number of different epochs ranging from 10, 25, 50, to 100 epochs. In one implementation, the doc2vec model 404 may have a learning rate alpha between 0.0001 and 0.1 with a logarithmic step. The learning rate may linearly drop to min_alpha over all inference epochs. If unspecified during inference, value from model initialization may be reused.

Broadly, a doc2vec model is an MLA designed for generating distributed representations of documents (e.g., text) in a continuous vector space. In the doc2vec framework, a given set of input vectors is associated with a unique vector representation, often referred to as an "embedding" or "output vector." This embedding encapsulates the semantic meaning and contextual information of the given set of input vectors. The doc2vec model can be used in various natural language processing (NLP) tasks, such as clustering, classification, and information retrieval operations.

In some embodiments, the security server 210 may be configured to concatenate the first set of vectors 340 into a concatenated vector before inputting the concatenated vector into the MLA 404. The security server 210 may be configured to store the session vector 340 in association with the first user credentials in the database 220, and which user credentials have been used in the first user session 361.

Developers of the present technology have realized that generating a vector based on a given set of vectors as described above results in a more effective discrimination of text-based command patterns by the doc2vec model. It should be noted that raw textual strings representing programming commands is a particular type of texts input, and a doc2vec model may not be able to generate dissimilar vectors for two raw and dissimilar textual command strings. For example, due to same programming language, without additional hints about the textual command string, the doc2vec model may generate generally similar vectors for a variety of textual commands, and thus may not be as good in discriminate between different text-based patters that users have.

Developers of the present technology have realized that processing the textual based command, including identifying specific types of information in the textual based command and providing that information to the doc2vec model (via a set of vectors carrying different types of data), the doc2vec model may be configured to generate more specific vectors for different users. It can be said that the doc2vec model may thus be more efficient at discriminating between different text-based command patters of different users. It can be said that generating and storing the so-generated vectors, the security server 210 may later use them for identifying a given user based on his/her textual patters and/or his/her programming style.

Threat Detection & Remedial Action Control

Figure 5:
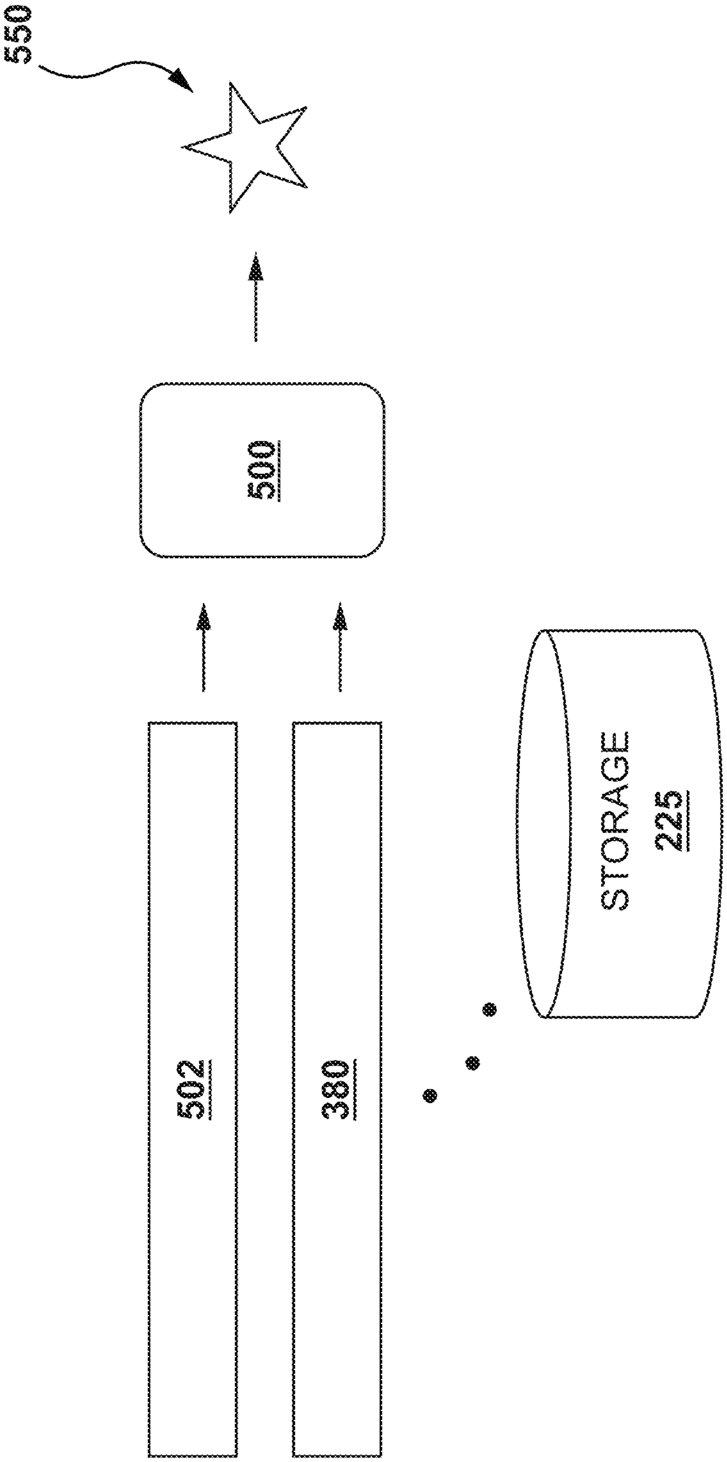
FIG. 5 is a schematic representation of a comparison between the session vector and a current session vector, as contemplated in at least some non-limiting embodiments of the present technology.

With reference to FIG. 5, there is depicted a comparison operation executable by the security server 210. During a current user session, the security server 210 may generate a current vector 502 session based on a current user textual string, similarly to how the security server 210 is configured to generate the session vector 380 during the first user session 361. The security server 210 may be configured to compare the current vector of the current user session to a stored vector. For example, it may identify a given store vector for comparison based on user credentials used in the first user session and the current user session.

In FIG. 5, there is depicted a current vector 502 generated by the security server 210 for a current textual text string. As it can be appreciated, the security server 210 can be configured to generate the current vector 502 based on a current set of vectors including a first current vector, a second current vector, and a third current vector (not separately depicted) representative of the current textual text string. The security server 210 can be configured to generate the first, second, and third current vectors in a similar fashion to that of generating the first, second, and third vectors 310, 320, and 330 for the textual character string 302.

Let it be assumed that the current user used credentials of the user 202. The security server 210 may be configured to retrieve from storage, the session vector 380 associated with the credentials of the user 202. The security server 210 may generate a similarity value 550 using a comparison algorithm 500 based on the pair of vectors including the current vector 502 and the session vector 380.

The security server 210 may then compare the similarity value 550 to a pre-determined threshold value. If the similarity value 550 is above the pre-determined threshold, the security server 210 may be configured to determine that the current user is the user 202.

If the similarity value 550 is below the pre-determined threshold, the security server 210 may be configured to determine that the current user is not the user 202, even though the current user employed credentials of the user 202 to access the computer network 200. If the similarity value 550 is below the pre-determined threshold, the security server 210 may trigger a remedial action.

However, in some non-limiting embodiments of the present technology, the security server 210 can be differently configured to detect a potential threat to the computer network 200 associated with fraudulent use of the credentials of the user 202 by the current user. More specifically, in some non-limiting embodiments of the present technology, the security server 210 can be configured to compare vectors representative of commands executed by the user 202 and those to be executed by the current user without use of the MLA 404. In this regard, according to certain non-limiting embodiments of the present technology, instead of generating the current vector 502, the security server 210 can be configured to: (i) generate, based on set of vectors of past user sessions of the user 202, such as the first, second, and third set of vectors 340, 350, and 360 associated with the first user session 361, respective command vectors, which is representative of text-based command patterns of the user 202; (ii) generate, based on the current set of vectors, a current command vector; and (iii) compare the current command vector with at least one of the respective command vectors associated with the user 202.

According to certain non-limiting embodiments of the present technology, to generate a given command vector, the security server 210 can be configured to concatenate vectors of the respective set of vectors, such as those of the first set of vectors 340. It can be said that the so generated command vector is, in a sense, a representation of typical text-based command patterns of the user 202. Further, the security server 210 can be configured to store the respective command vectors, for example, in an internal memory of the security server 210, that is, the solid-state drive 120, for example.

To compare the current command vector with a given command vector (such as that generated based on the first set of vectors 340) associated with the user 202, according to certain non-limiting embodiments of the present technology, the security server 210 can be configured to generate the similarity value 550 between these two vectors and compare the similarity value 550 with an other pre-determined threshold. In some non-limiting embodiments of the present technology, the similarity value 550 can be a cosine similarity value. Further, similar to the above-described embodiments, in response to the similarity value 550 being greater than the other pre-determined threshold, the security server 210 can be configured to determine that the current user is the user 220. By contrast, if the similarity value 550 is below the other pre-determined threshold, the security server 210 can be configured to determine that the current user is not the user 202 and trigger the execution of the remedial action.

Further, in some non-limiting embodiments of the present technology, the security server 210 can be configured to compare the current command vector with a plurality of command vectors associated with the user 202. To that end, the security server 210 can be configured to: (i) determine a respective similarity value (that can be similar to the similarity value 550 above) between the current command vector and each one of the plurality of command vectors; and (ii) determine a combined similarity value based on the respective similarity values.

In some non-limiting embodiments of the present technology, the security server 210 can be configured to determine the combined similarity value only based on top-N respective similarity values associated with the respective command vectors. For example, the security server 210 can be configured to select, for example, top five, top ten, or top twenty respective similarity values for further determining the combined similarity value.

In some non-limiting embodiments of the present technology, the combined similarity value can comprise an average value of the respective similarity values. In other non-limiting embodiments of the present technology, the combined similarity value can comprise a median value of the respective similarity values. Further, akin to the above, the security server 210 can be configured to compare the combined similarity value with the other pre-determined threshold, and, based on this comparison, determine whether the current user is the user 202 or not.

In a first embodiment, the remedial action may be prohibiting execution of the current command on the database 220. In a second embodiment, the remedial action may be interrupting the current user session. In a third embodiment, the remedial action may be decoupling the current user device from the computer network 200. In a fourth embodiment, the remedial action may be suspending credentials of the user 202.

Figure 6:
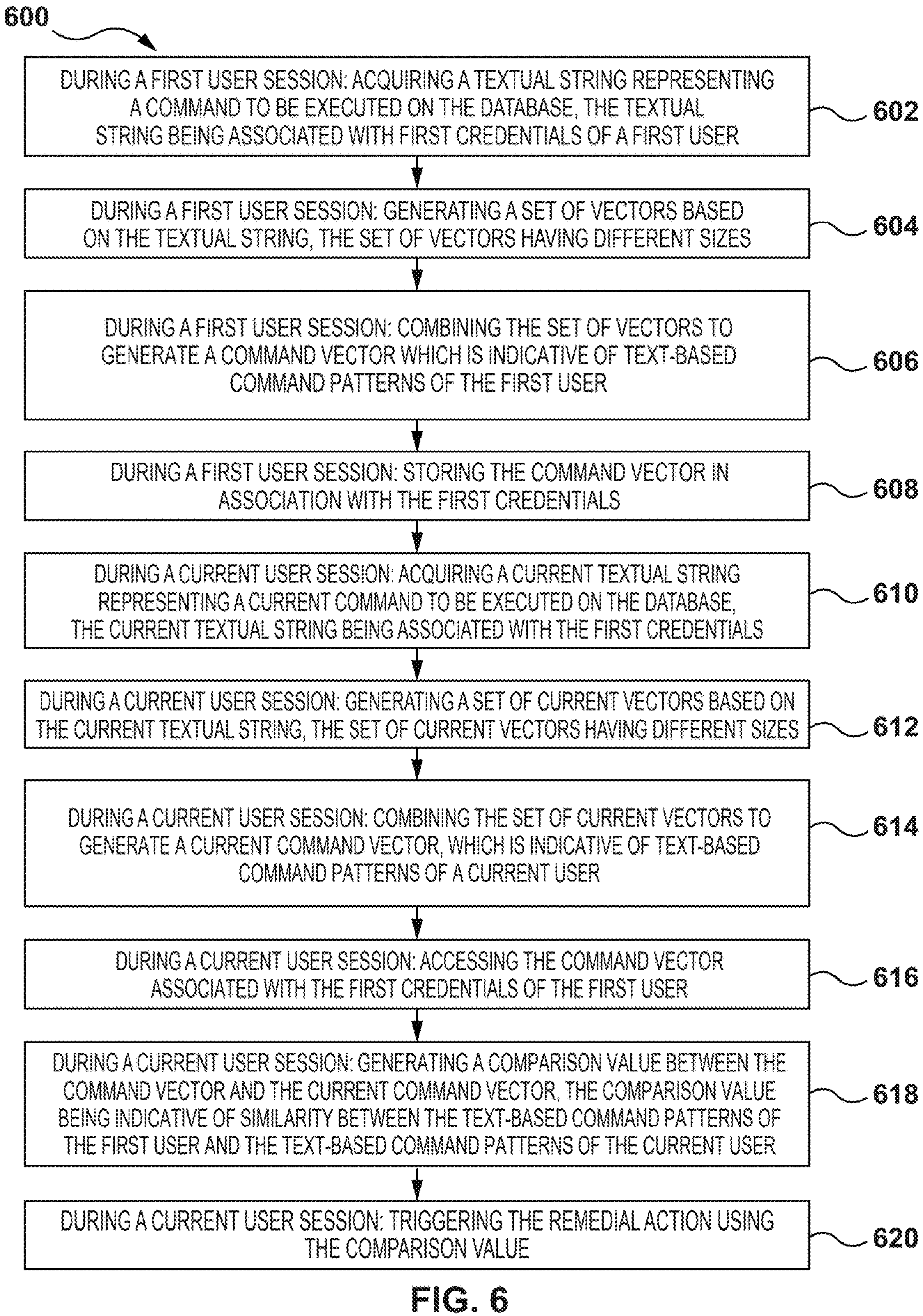
FIG. 6 is a scheme-block illustration of a method executed by a processor of the computing device of FIG. 1, in accordance with at least some non-limiting embodiments of the present technology.

In some embodiments of the present technology, the security server 210 may be configured to execute a method 600 illustrated in FIG. 6. It should be noted that the security server 210 may be implemented similarly to how the computer device 100 of FIG. 1 is implemented. Various steps of the method 600 will now be described.

STEP 602: During a First User Session: Acquiring a Textual String Representing a Command to be Executed on the Database, the Textual String Being Associated With First Credentials of a First User The method 600 begins at step 602, with the security server 210 configured to during a first user session acquire a textual string representing a command to be executed on the database, the textual string being associated with first credentials of a first user.

In some embodiments of the present technology, the security server 210 may be configured to, prior to the first user session: acquire credential data representative of the credentials of the first user, authenticate the first user using the credential data, and trigger the first user session.

For example, with reference to FIG. 2, the security server 210 may be configured to acquire data 292 from the user device 203. The data 292 may comprise user credentials of the first user 202 and/or device credentials of the device 203. In some embodiments, user credentials of the suer 202 an/or device credentials of the device 203 may be implemented via know techniques. The security server 210 may be configured to authenticate the user device 203 and/or the first user 202 and launch a first user session for the user 202.

It should be noted that the data 292 may also comprise the textual character string 302 seen in FIG. 4. The textual character string 302 is indicative of a command to be executed on the database 220.

STEP 604: During a First User Session: Generating a Set of Vectors Based on the Textual String, the Set of Vectors Having Different Sizes The method 600 continues to step 604, with the security server 210 configured to generate a set of vectors based on the textual string, the set of vectors having different sizes. For example, and the reference to FIG. 4, the security server 210 may be configured to generate the first vector 310, the second vector 320, and the third vector 330 based on the textual character string 302.

It is contemplated that the security server 210 may be configured to apply one or more algorithms for generating the respective ones from the set of vectors 340. The security server 210 may be configured to generate the first vector 310 indicative of a command type of the command, the second vector 320 indicative of a command name of the command, and the third vector 330 indicative of a command body of the command, including at least one of an argument of the command and a database address specified in the command body. In some non-limiting embodiments of the present technology, the third vector 330 can be representative of both the command name and the command body.

In some embodiments, the first vector 310 has a first size, the second vector 320 having a second size, the third vector 330 having a third size, the third size being larger than the first size and the second size. It is contemplated that generating the third vector 330 may include the security server 210 configured to generate a reduced textual string by filtering out pre-determined textual characters from the textual character string 302. It is contemplated that generating separate vectors carrying specific information and of different size, may provide additional knowledge to a machine learning model about the textual character string 302 if compared to the provision of the raw textual character string 302 itself.

STEP 606: During a First User Session: Combining the Set of Vectors to Generate a Command Vector Which is Indicative of Text-Based Command Patterns of the First User The method 600 continues to step 606, with the security server 210, during the first user session, being configured to generate, based on the set of vectors, the command vector 502. In some non-limiting embodiments of the present technology, to generate the command vector, the security server 210 can be configured to concatenate the first, second, and third vectors 310, 320, and 330.

However, in other non-limiting embodiments of the present technology, at step 606, the security server 210 could be configured to during the first user session: generate, using a machine learning model, a session vector for the first user session using the set of vectors, the session vector being indicative of text-based command patterns of the first user.

For example, the security server 210 may be configured to employ the first set of vectors 340 as input to the MLA model 404 for generating the session vector 380. The MLA model 404 may be a doc2vec model implemented similarly to how the model in the article "*Distributed Representations of Sentences and Documents*" is implemented, without departing from the scope of the present technology. It can be said that the session vector 380 is a user-specific and session-specific vector. The session vector 380 is indicative of a text-based command pattern of a specific user in a specific session.

In this example, the security server 210 may generate the session vector 380 for the user 202 and the first user session 361 based on the first set of vectors 340, the second set of vectors 350, and the third set of vectors 360. However, it is contemplated that only one set of vectors amongst the first set of vectors 340, the second set of vectors 350, and the third set of vectors 360 may be inputted into the MLA 404 in order to generate the session vector 380.

In some embodiments, the security server 210 may input the first set of vectors 340, the second set of vectors 350, and the third set of vectors 360 into the MLA 404, which in response may output the session vector 380. In other embodiments, the security server 210 may input the first set of vectors 340 into the MLA 404 configured to output in response a first command vector, input the second set of vectors 350 into the MLA 404 configured to output in response a second command vector, input the third set of vectors 360 into the MLA 404 configured to output in response a third command vector, and generate the session vector 380 as an average of the third command vector, the second command vector, and the third command vector.

STEP 608: During a First User Session: Storing the Command Vector in Association With the First Credentials The method 600 continues to step 608, with the security server 210 configured to during the first user session: storing one of the command and session vectors in association with the first credentials of the user 202. For example, the security server 210 may configured to store one or more command/session vectors in association with respective credentials in the internal memory of the security server 210, such as the solid-state drive 120. However, other types of storage both integral and external, such as those distributed over the computer network 200, to the security server 210 can be used for storing command/session vectors without departing from the scope of the present technology.

STEP 610: During a Current User Session: Acquiring a Current Textual String Representing a Current Command to be Executed on the Database, the Current Textual String Being Associated With the First Credentials The method 600 continues to step 610, with the security server 210 configured to during a current user session: acquiring a current textual string representing a current command to be executed on the database, the current textual string being associated with the first credentials.

In some embodiments, prior to the current user session, the security server 210 may be configured to acquire current credential data representative of the credentials of the first user; authenticating the current user as the first user using the current credential data; and triggering the current user session. In this embodiment, it should be noted that if a remedial action is to be triggered by the security server 210, the security server 210 may trigger the remedial action despite the current user being authenticated as the first user based on the current credential data.

It should also be noted that the textual character string 302 and the current textual string may be received from the same device (e.g., the user device 203). Alternatively, the textual character string 302 and the current textual string may be received from different user devices, without departing from the scope of the present technology.

STEP 612: During a Current User Session: Generating a Set of Current Vectors Based on the Current Textual String, the Set of Current Vectors Having Different Sizes The method 600 continues to step 612, with the security server 210 configured to generate a set of current vectors based on the current textual string. This step can be executed similarly to how the security server 210 generates the first set of vectors 340 for the textual character string 302 during the first user session, but based on the current textual string instead of the textual character string 302. In some embodiments, the server 210 may be configured to generating a first current vector indicative of a command type of the current command, generating a second current vector indicative of a database address of the current command, and generating a third current vector indicative of a filtered representation of the current textual string.

STEP 614: During a Current User Session: Combining the Set of Current Vectors to Generate a Current Command Vector, Which is Indicative of Text-Based Command Patterns of a Current User The method 600 continues to step 614, with the security server 210 being configured to generate the current command vector as described above. The security server 210 may be configured to execute the step 614 similarly to how the security server 210 executes the step 606, but based on the set of current vectors instead of the set of vectors 340.

In other non-limiting embodiments of the present technology, at step 614, the security server 210 can be configured to generate the current session vector based on the set of current vectors. For example, the security server 210 may be configured to employ the set of current vectors 340 as input to the MLA model 404 for generating the current session vector 502. It can be said that the current session vector 502 is a user-specific and session-specific vector. The current session vector 502 is indicative of a text-based command pattern of a specific user in a current session.

In this example, the security server 210 may generate the current session vector 502 for the current user and the current user session based on the set of current vectors. However, it is contemplated that more than one set of current vectors generated for more than one current textual string may be used to generate the current session vector for the current session.

STEP 616: During a Current User Session: Accessing the Command Vector Associated With the First Credentials of the First User The method 600 continues to step 616, with the security server 210 configured to access at least one command vector generated during one of past first user sessions for further comparison. For example, the security server 210 may use user credentials provided during the current user session as a key for accessing a corresponding session and command vectors thereof stored in the memory of the security server 210, such as the solid-state drive 120.

However, in those embodiments where the security server 210 uses sessions vectors for identifying potential fraud associated with the credentials of the first user, at step 616, the security server 210 can be configured to access the session vector 380 associated with the first credentials associated with the first user 202. For example, the security server 210 may use user credentials provided during the current user session as a key for accessing a corresponding session stored in the memory of the security server 210, such as the solid-state drive 120.

STEP 618: During a Current User Session: Generating a Comparison Value Between the Command Vector and the Current Command Vector, the Comparison Value Being Indicative of Similarity Between the Text-Based Command Patterns of the First User and the Text-Based Command Patterns of the Current User The method 600 continues to step 618, with the security server 210 configured to generate a comparison value 550 between the current command vector and at least one command vector associated with the user 202 as described above. The comparison value 550 being indicative of similarity between the text-based command patterns of the first user 202 and the text-based command patterns of the current user. In some embodiments, the comparison value may be a cosine similarity value between the pair vectors.

In other non-limiting embodiments of the present technology where for detecting the potential threat, the security server 210 utilizes session vectors, at step 618, the session vector 380 and the current session vector 503.

STEP 620: During a Current User Session: Triggering the Remedial Action Using the Comparison Value The method 600 continues to step 620, with the security server 210 configured to trigger a remedial action using the comparison value. In some embodiments, in response to the comparison value 550 being above a pre-determined threshold, the security server 210 may trigger execution of the current command on the database 220. In other embodiments, in response to the comparison value 550 being below a pre-determined threshold, the security server 210 may be configured to trigger a remedial action.

In some embodiments, the remedial action may be at least one of: prohibiting execution of the current command on the database, interrupting the current user session, decoupling the other user device from the computer network, and suspending credentials of the first user.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of triggering a remedial action to a potential threat to a computer network, the computer network comprising a security server and a database, the computer network being communicatively couplable with a user device, the method executable by the security server and comprising:
- during a first user session:
  - acquiring a textual string representing a command to be executed on the database, the textual string being associated with first credentials of a first user;
  - generating a set of vectors based on the textual string, the set of vectors having different sizes, the generating including:
    - generating a first vector indicative of a command type of the command;
    - generating a second vector indicative of a command name of the command; and
    - generating a third vector indicative of a command body of the command;
  - combining the set of vectors to generate a command vector which is indicative of text-based command patterns of the first user;
  - storing the command vector in association with the first credentials;
- during a current user session:
  - acquiring a current textual string representing a current command to be executed on the database, the current textual string being associated with the first credentials;
  - generating a set of current vectors based on the current textual string, the set of current vectors having different sizes, the generating including:
    - generating a first current vector indicative of the command type of the current command;
    - generating a second current vector indicative of the command name of the current command; and
    - generating a third current vector indicative of the command body of the current textual string;
  - combining the set of current vectors to generate a current command vector, which is indicative of text-based command patterns of a current user;
  - accessing the command vector associated with the first credentials of the first user;
  - generating a comparison value between the command vector and the current command vector,
    - the comparison value being indicative of similarity between the text-based command patterns of the first user and the text-based command patterns of the current user;
  - triggering the remedial action using the comparison value.

2. The method of claim 1, wherein the method further comprises:
- prior to the first user session:
  - acquiring credential data representative of the credentials of the first user;
  - authenticating the first user using the credential data; and
  - triggering the first user session.

3. The method of claim 1, wherein the method further comprises:
- prior to the current user session:
  - acquiring current credential data representative of the credentials of the first user;
  - authenticating the current user as the first user using the current credential data; and
  - triggering the current user session; and
- wherein the triggering the remedial action includes triggering the remedial action despite the current user being authenticated as the first user based on the current credential data.

4. The method of claim 1, wherein the remedial action is at least one of:
- prohibiting execution of the current command on the database;
- interrupting the current user session;

decoupling the other user device from the computer network; and
suspending credentials of the first user.

5. The method of claim 1, wherein the method further comprises:
in response to the comparison value being above a pre-determined threshold, triggering execution of the current command on the database.

6. The method of claim 1, wherein the triggering the remedial action comprises:
triggering the remedial action in response to the comparison value being below a pre-determined threshold.

7. The method of claim 1, wherein the first vector has a first size, the second vector having a second size, the third vector having a third size, the third size being larger than the first size and the second size.

8. The method of claim 1, wherein the generating the third vector includes generating a reduced textual string by filtering out pre-determined textual characters from the textual string.

9. The method of claim 1, wherein the combining the set of vectors to generate the command vector comprises concatenating the first, second, and third vectors.

10. The method of claim 1, wherein the generating the comparison value comprises determining a cosine similarity value between the command and current command vectors.

11. The method of claim 1, further comprising:
accessing a plurality of command vectors including the command vector,
each command vector of the plurality of command vectors having been generated based on a respective command executed by the first user prior to the current session;
generating respective pairwise comparison values between the current command vector and each one of the plurality of command vectors;
determining a combined value of the respective pairwise comparison values; and
wherein the triggering the remedial action comprises triggering the remedial action using the combined value of the respective pairwise comparison values.

12. The method of claim 11, wherein prior to the determining the combined value, the method further comprises selecting top-N respective pairwise comparison values; and
wherein the determining the combined value comprises determining a combined value of the top-N respective pairwise comparison values.

13. The method of claim 11, wherein the determining the combined value comprises determining one of an average value and a median value of the respective pairwise comparison values.

14. The method of claim 1, wherein, prior to the generating the comparison value, the method further comprises:
during the first user session:
acquiring other textual string, from the user device, representing an other command to be executed on the database, the other textual string being associated with the first credentials;
generating a set of other vectors based on the other textual string, the set of other vectors having different sizes, the generating including:
generating a first other vector indicative of a command type of the other command;
generating a second other vector indicative of the command name the other command; and
generating a third other vector indicative of the command body of the other textual string;
and wherein the generating the command vector includes generating a session vector by applying a machine-learning model to the set of vectors and the set of other vectors; and
wherein during the current user session, the method further comprises:
generating a current session vector by applying the machine-learning model to the set of current vectors; and
wherein the generating the comparison values comprises generating the comparison value between the current session vector and the session vector.

15. The method of claim 1, wherein the command body of the command comprises a set of respective instructions to be executed on the database.

16. The method of claim 15, wherein prior to the generating the third vector, the method further comprising normalizing the set of instructions of the command body.

17. The method of claim 1, wherein the textual string and the current textual string are both received from the user device or received from different user devices.

18. A server for triggering a remedial action to a potential threat to a computer network, the computer network comprising the server and a database, the computer network being communicatively couplable with a user device, the server being configured to:
during a first user session:
acquire a textual string representing a command to be executed on the database, the textual string being associated with first credentials of a first user;
generate a set of vectors based on the textual string, the set of vectors having different sizes, by:
generating a first vector indicative of a command type of the command;
generating a second vector indicative of a command name of the command; and
generating a third vector indicative of a command body of the command;
combine the set of vectors to generate a command vector which is indicative of text-based command patterns of the first user;
store the command vector in association with the first credentials;
during a current user session:
acquire a current textual string representing a current command to be executed on the database, the current textual string being associated with the first credentials;
generate a set of current vectors based on the current textual string, the set of current vectors having different sizes, by:
generating a first current vector indicative of the command type of the current command;
generating a second current vector indicative of the command name of the current command; and
generating a third current vector indicative of the command body of the current textual string;
combine the set of current vectors to generate a current command vector, which is indicative of text-based command patterns of a current user;
access the command vector associated with the first credentials of the first user;
generate a comparison value between the command vector and the current command vector, the comparison value being indicative of similarity between the text-based command patterns of the first user and the text-based command patterns of the current user;

trigger the remedial action using the comparison value.

19. The server of claim 18, wherein the server is further configured to:

prior to the first user session:

acquire credential data representative of the credentials of the first user;

authenticate the first user using the credential data; and trigger the first user session.

20. The server of claim 18, wherein the server is further configured to:

prior to the current user session:

acquire current credential data representative of the credentials of the first user;

authenticate the current user as the first user using the current credential data; and trigger the current user session; and wherein to trigger the remedial action includes the server configured to trigger the remedial action despite the current user being authenticated as the first user based on the current credential data.

* * * * *